Figure 5:
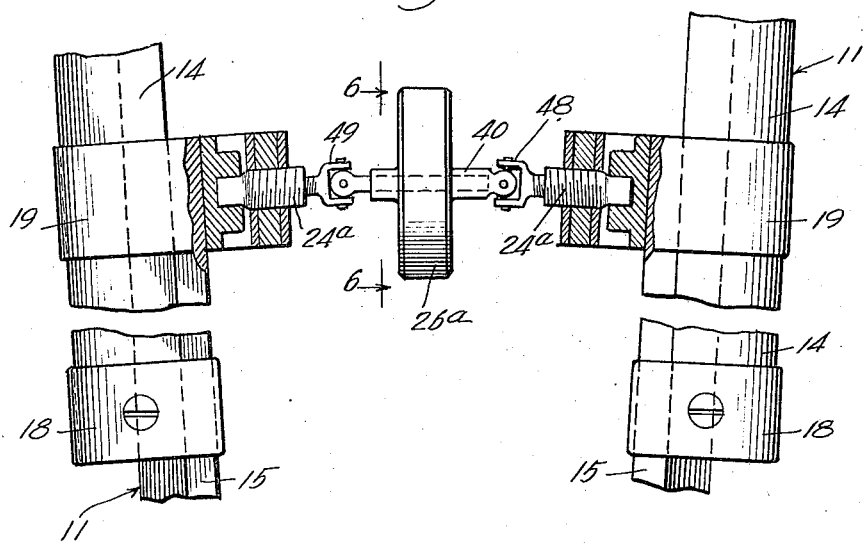

G. A. MITCHELL.
TRIPOD AND TRIPOD CLAMP.
APPLICATION FILED SEPT. 21, 1920.
1,426,088.
Patented Aug. 15, 1922.
2 SHEETS—SHEET 1.
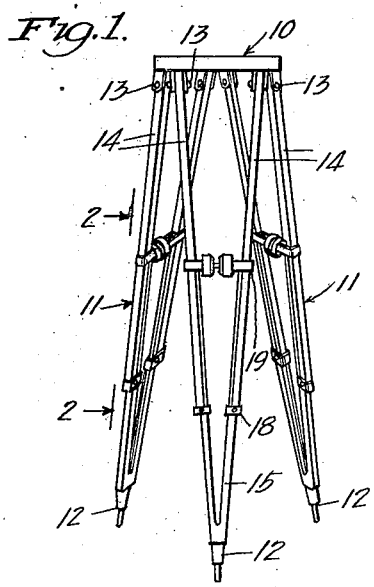
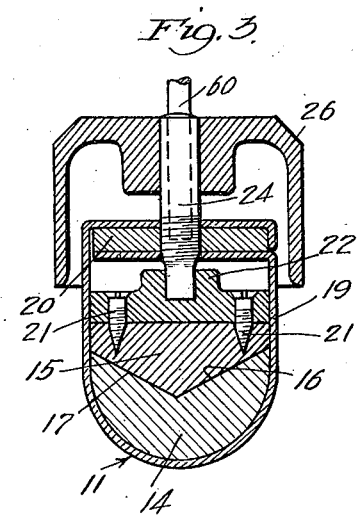
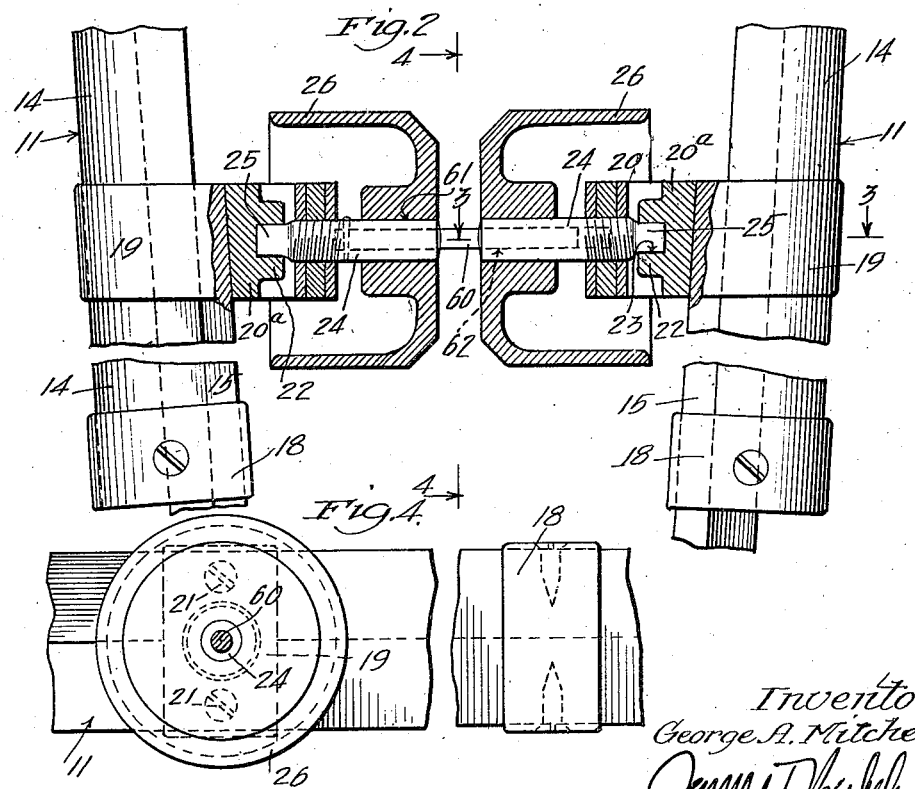
Inventor:
George A. Mitchell
By [signature]
his Attorney

G. A. MITCHELL.
TRIPOD AND TRIPOD CLAMP.
APPLICATION FILED SEPT. 21, 1920.

1,426,088.

Patented Aug. 15, 1922.
2 SHEETS—SHEET 2.

Inventor:
George A. Mitchell
By
his Attorney

UNITED STATES PATENT OFFICE.

GEORGE A. MITCHELL, OF LOS ANGELES, CALIFORNIA, ASSIGNOR TO MITCHELL CAMERA CO., OF LOS ANGELES, CALIFORNIA, A CORPORATION OF CALIFORNIA.

TRIPOD AND TRIPOD CLAMP.

1,426,088.  Specification of Letters Patent.  Patented Aug. 15, 1922.

Application filed September 21, 1920. Serial No. 411,826.

*To all whom it may concern:*

Be it known that I, GEORGE A. MITCHELL, a citizen of the United States, residing in Los Angeles, county of Los Angeles, State of California, have invented new and useful Improvements in Tripods and Tripod Clamps, of which the following is a specification.

This invention relates to tripods and like devices and to clamps for such devices, and the object of the invention is to provide certain improvements in devices of this character to render them simple, and easily, conveniently, and quickly adjustable.

Broadly speaking, one phase of the invention has to do with adjusting means particularly, although not specifically, adapted for use in tripods and other like folding and adjustable devices. For purpose of illustration, and to facilitate in making clear the nature of the invention in a simple and readily understandable manner I will herein refer to, and describe the invention in connection with, a typical form of tripod, such as is commonly used to carry cameras, surveying instruments, etc., it being understood, however, that such disclosure is not to act in any way as a limitation of the scope of the invention.

Ordinary tripods, such as are at present commonly used to carry cameras of various kinds, surveying instruments, etc., are constructed with light adjustable and collapsible legs. To provide light strong and rigid devices the legs are each formed of two upwardly diverging sides, and in order that they may be adjustable and collapsible, the legs are constructed in sections adapted to adjustably telescope or overlap one over the other. Means are generally provided in an inconvenient manner in connection with sides of the legs for adjusting and clamping, or otherwise securing, the sections of the legs in the proper or desired relative positions. To operate tripods of this general character, the operator must perform a comparatively large number of distinct operations both in setting up the tripod and in adjusting it after it has been set up. Further, the operations necessary on the part of the operator require a considerable amount of time not only because of their number but due to the inconvenience to which the operator is put in carrying them out.

A primary object of the invention is to overcome the above outlined and other similar objections common to ordinary tripods in a simple, effective, and inexpensive manner.

By the present invention a tripod is provided with legs each formed with two sides and each side formed of sections overlapping one over the other. Each leg is provided with clamping or locking means in connection with each of its sides, which clamping means can be operated simultaneously by one hand and by a single operation on the part of the operator. Further, the clamping or locking means are so arranged and positioned on the sides of the legs that they are in convenient reach of the operator. These features of the invention are particularly noteworthy in that they provide a tripod which can be easily, conveniently and quickly manipulated.

Other objects and features of the invention and the means by which I carry out the various objects and features of the invention will be best understood from the following detailed description of typical embodiments of the invention throughout which reference is had to the accompanying drawings in which—

Figure 6:
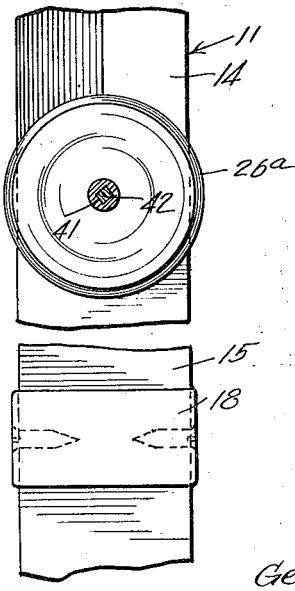

Fig. 1 is a perspective view of a tripod constructed in accordance with the present invention; Fig. 2 is an enlarged view of a portion of one of the legs of the tripod being a view taken as indicated on line 2—2 on Fig. 1; and having some parts shown in section to show their construction; Fig. 3 is a detailed sectional view taken as indicated by line 3—3 on Fig. 2; Fig. 4 is a view taken as indicated by line 4—4 on Fig. 2; Fig. 5 is a view similar to Fig. 2 of another form of the invention; and Fig. 6 is a sectional view taken as indicated by line 6—6 on Fig 5.

Throughout the drawings numeral 10 designates the head of the tripod which is carried by the legs 11. Each leg 11 is provided with a foot 12 from which the two sides of the leg extend divergingly to points 13 where they pivotally connect to the head 10. Each side of each leg 11 comprises an upper section 14 pivotally connected at 13 to the head 10 and a lower section 15 connecting at its lower end to the lower section of the other side of the leg and to the foot 12, as clearly shown in Fig 1 of the drawings. The upper and lower sections 14 and 15 of the sides are arranged and constructed to slide together or overlap so that the legs can be adjusted to various lengths and so that the legs can be telescoped or collapsed when desired. In the particular form of construction shown in the drawings the adjacent faces 16, of the upper section 14 of each side, are grooved or V-shaped to receive the more or less pointed outer faces 17 of the lower sections 15, in the manner clearly shown in Fig 3 of the drawings. A band 18 is carried at the lower end of each upper section 14 to extend around and form a guide for the lower section 15 which co-operates with the upper section. Bands 19, similar in purpose to the bands 18 are carried directly opposite each other at the upper ends of the lower sections 15 in the manner clearly shown throughout the drawings.

Each band 19 is a single strip of metal shaped to extend around the sections 14 and 15 and to be in engagement with the outer part of section 14 and the side parts of section 15. The end portions of the band are spaced from the inner face of the lower section 15, and are overlapped at the inner face of the lower section 15, and are spaced apart in the manner clearly shown in Fig. 3. A block or nut member 20 is carried between the overlapping end portions of the band 19 and a bracket 20 is arranged between the innermost end portion of the band 19 and the inner face of the lower section 15. A bracket or plate 20ª is secured to the inner face of the lower section 15 by means of suitable screws 21 and is formed with a horizontally disposed boss 22 in which there is a socket 23. A screw member 24 is screw-threadedly carried in the nut member 20 so that its end portions 25 is carried in the socket 23 in plate 20ª. A hand wheel 26 is carried on the portion of the screw member 24, which extends from the band 19 and extends therefrom toward the side of the leg and over the portions of the band 19 which are spaced from the sections of the leg. The hand wheel provides means by which the screw member may be operated or rotated. With the construction just described the band 19 is held in place and against displacement by the extension of the end portion 25 of the screw 24, into the socket 23 in plate 20ª. This construction is noteworthy because of its simplicity and also because it allows the band 19 to freely and properly seat on, or engage, the upper section 14. It will be readily understood how rotation of the hand wheel 26 in one direction will cause movement of the plate 20ª away from the overlapping portions of the band 19 and thereby cause the upper and lower sections 14 and 15 to be clamped together, while rotation of the hand wheel 24 in the other direction will relieve the clamping action between the upper and lower sections and allow them to be easily slid or moved relative to each other. In other words, the band 19 and the various other parts which cooperate with it provide means for guiding the upper section 14 at the upper end of the lower section 15, and also means for locking or clamping the upper and lower sections against being slid or moved relative to each other.

The arrangement of the band 19 so that its overlapping end portions, the nut member, the plate 20ª, and the screw member 24, are at the inner face of the lower section 15 causes hand wheel 26 to be between the sides of the leg. In practice the two lower sections 15 of each leg are made the same length causing the clamping mechanisms to be directly opposite each other, and the screw members 24 and various parts of the clamping means are concentric and so proportioned that the two hand wheels 26 of the adjusting mechanism are comparatively close together. The two screw members 24 and the two hand wheels 26 of the two clamping mechanisms of a leg are proportioned and arranged so that they will not engage, or interfere with each other but will allow free adjustment of the sections 14 and 15. In practice the screw members and hand wheels are spaced a maximum distance apart when the leg is completely telescoped or collapsed and are practically together, or at a minimum distance apart, when the leg is in its completely extended position. The variations in the distance between the screw members, or hand wheels, is due to the upward divergence of the sides of the leg. To hold the screw members concentric relative to each other a pin 60 is carried in a bore 61 in one of the screw members to slidably extend into a bore 62 in the other screw member as clearly shown in Fig. 2 of the drawings.

In practice the construction and arrangement of the various parts is such that at no time do the hand wheels 26 become spaced apart a sufficient amount to make it impossible, or in fact, inconvenient, for an operator to simultaneously grip and turn both of them with one hand. This is particularly noteworthy and important in that it provides means for completely clamping the leg, or completely releasing the leg, actuatable by a single operation. It may be here stated that the threads on the two screw-threaded members 24 are formed oppositely so that rotation of the two hand wheels in the same direction will cause the same action to take place in each of the clamping mechanisms. In other words, the screw-threads on one of the screw members 24 is left handed while the screw threads on the other member is right handed. Another important feature from an operative standpoint is that the clamping means for the legs are positioned so that they are a definite or fixed distance from the ground, or surface, on which the tripod is resting and are always as close as possible to the head 10. This is because of their being mounted on the extreme upper ends of the lower sections 15. This feature of the invention combined with the feature of being able to simultaneously operate both sides of a leg makes for simple, convenient, and quick operation and thereby makes the invention desirable for practical application and of particular commercial value.

In the form of the invention shown in Figs. 5 and 6 the screw members 24$^a$, of the clamping means at the sides of the leg, are arranged at right angles to the sides of the legs and are adapted to be operated by, or from, a single hand wheel 26$^a$. The hand wheel 26$^a$ is formed on a member 40 formed with a square socket 41 in which is slidably carried a square rod 42. The member 40 is connected to one of the screw members 24$^a$ through a universal joint mechanism 48 while the rod 42 is connected to the other screw member 24$^a$ through a universal joint mechanism 49. It will be readily understood how the member 40 and bar 41 cooperate to cause both of the screw members 24$^a$ to be rotated when the hand wheel 26$^a$ is rotated, and how the rod 42 being slidably carried in the socket 41 allows for variation, in the distance between the clamping means, such as is caused by adjusting or varying the relative positions of the upper and lower sections of the leg. This is a particularly desirable form of the invention in that it embodies a single operating member for both clamping means and is therefore somewhat easier of operation than the form of the invention first described.

Having set forth only preferred forms of the invention I do not wish to limit or restrict myself to the specific details hereinabove set forth but wish to reserve to myself any changes or variations that may appear to those skilled in the art or that may fall within the scope of the following claims.

Having described a preferred form of my invention, I claim:

1. In a tripod or the like having an adjustable leg formed of adjustable overlapping sections, means for clamping the sections together, said means comprising a band extending around the sections, a nut member carried by the band to be spaced from one of the sections, a plate carried by said section, and a screw member carried in the nut member to engage the plate.

2. In a tripod or the like having an adjustable leg formed of adjustable overlapping sections, a band extending around the sections and having spaced overlapping end portions spaced from the sections, a nut member carried between said end portions, a plate attached to one of the sections and having a socket, and a screw carried in the nut and extending into the socket.

3. In a tripod, or the like, having an adjustable leg with two spaced side parts one comprising overlapping sections, means for clamping the sections of said side part together comprising, a part connected with the sections and having a portion projecting from the sections toward the other side part, a screw member carried by said projecting portion to have a part projecting therefrom toward said other side part and having a part adapted to cause clamping of the sections upon rotation of said screw member, and a hand wheel mounted on said projecting part of the screw member, the hand wheel having a projecting rim part overhanging said projecting portion and forming a comparatively large part to be gripped by an operator.

4. In a tripod or the like having an adjustable leg with two spaced side parts each formed of overlapping sections, independent means in connection with each side part for holding the sections thereof against relative movement, and independently operable operating members for each of said means lying between the side parts and being arranged so that they can be simultaneously gripped and operated by one hand.

5. In a tripod or the like having an adjustable leg with two spaced side parts formed of overlapping sections, a member in connection with each side part connecting the sections thereof, a screw carried by each of said members between the side parts and adapted to be actuated to clamp the sections of the side parts together, and independently operable hand wheels carried on the screws and arranged so that they can be simultaneously gripped and operated.

In witness that I claim the foregoing I have hereunto subscribed my name this 30th day of August, 1920.

GEORGE A. MITCHELL.

Witness:
VIRGINIA BERINGER.